US010987749B2

(12) United States Patent
Knoener et al.

(10) Patent No.: US 10,987,749 B2
(45) Date of Patent: Apr. 27, 2021

(54) METHODS AND SYSTEMS FOR INDICATING A SCHEDULE IN A WELDING-TYPE TORCH

(71) Applicant: Illinois Tool Works Inc., Glenview, IL (US)

(72) Inventors: Craig Steven Knoener, Appleton, WI (US); Chris J. Roehl, Appleton, WI (US); Andrew James Thielke, Kaukauna, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 374 days.

(21) Appl. No.: 15/398,452

(22) Filed: Jan. 4, 2017

(65) Prior Publication Data

US 2018/0185947 A1   Jul. 5, 2018

(51) Int. Cl.
*B23K 9/095*     (2006.01)
*B23K 9/32*      (2006.01)
(Continued)

(52) U.S. Cl.
CPC .......... *B23K 9/0956* (2013.01); *B23K 9/1006* (2013.01); *B23K 9/1087* (2013.01); *B23K 9/287* (2013.01); *B23K 9/32* (2013.01)

(58) Field of Classification Search
CPC ........ B23K 9/0956; B23K 9/32; B23K 9/287; B23K 9/1087; B23K 9/1006
(Continued)

(56) References Cited

U.S. PATENT DOCUMENTS 685,591 A    10/1901   Fernez
5,436,427 A  *  7/1995   Bourque ............... B23K 9/1043
                                          219/130.01
(Continued)

FOREIGN PATENT DOCUMENTS

CN    1313155       9/2001
CN    101516561     8/2009
(Continued)

OTHER PUBLICATIONS

Communication from European Patent Office Appln No. 18 150 120.6 dated Jul. 4, 2018 (9 pgs).
(Continued)

*Primary Examiner* — Dana Ross
*Assistant Examiner* — Kuangyue Chen
(74) *Attorney, Agent, or Firm* — McAndrews, Held & Malloy, Ltd.

(57) ABSTRACT

Systems and methods are provided for indicating schedules in welding-type torches. A welding-type system may comprise a welding-type power source, a welding-type torch, driven by the welding-type power source, and a welding-type connector configured for connecting the welding-type power source to the welding-type torch. The welding-type torch may comprise one or more indication components configured for providing, to a user of the welding-type system, indications relating to at least one of operations of the welding-type torch, status of welding-type operations, or welding-type parameters. The one or more indications comprise an indication of a present value of a particular welding-type parameter that pertains to configuration of the welding-type power source; and the one or more indication components are configured to provide the indication of present value of the particular welding-type parameter with- (Continued)

out requiring a change to structure of the welding-type connector.

19 Claims, 4 Drawing Sheets

(51) Int. Cl.
*B23K 9/10* (2006.01)
*B23K 9/28* (2006.01)

(58) Field of Classification Search
USPC .......................................... 219/130, 130.01
See application file for complete search history.

(56) References Cited

U.S. PATENT DOCUMENTS

| | | | |
|---|---|---|---|
| 2008/0116185 A1 | 5/2008 | Luck et al. | |
| 2011/0220616 A1* | 9/2011 | Mehn | B23K 9/291 |
| | | | 219/74 |
| 2012/0152923 A1* | 6/2012 | Sickels | B23K 9/10 |
| | | | 219/130.21 |
| 2012/0241431 A1* | 9/2012 | Sickels | B23K 9/124 |
| | | | 219/137.7 |
| 2014/0326706 A1* | 11/2014 | Dunahoo | B23K 9/1336 |
| | | | 219/137.2 |
| 2016/0163221 A1* | 6/2016 | Sommers | A61F 9/06 |
| | | | 434/234 |
| 2016/0193682 A1* | 7/2016 | Vogel | B23K 9/1087 |
| | | | 219/132 |
| 2018/0185947 A1* | 7/2018 | Knoener | B23K 9/0956 |

FOREIGN PATENT DOCUMENTS

| | | | |
|---|---|---|---|
| CN | 101791750 | 8/2010 | |
| DE | 4313508 | 10/1994 | |
| DE | 4313508 A1 * | 10/1994 | ............ B23K 9/092 |

OTHER PUBLICATIONS

Bombardier et al: "Dual Digimig/Pulse Feeder and SVI-450i Power Supply", Feb. 1999 (Feb. 1999), XP055480578, Retrieved from the Internet: URL:https:IIwww.esabna.com/eu/literature/arc%20equipmentl accessories/dual%20digimig_pulse_fdr%20&%20svi-450i_15-565.pdf [retrieved on Jun. 1, 2018].
SPS_PW_TPSi_JobMaster_Display.png, 1 page.
Fronius Welding Torches, Fronius International GmbH, dated Jul. 11, 2011, 48 pages.

* cited by examiner

METHODS AND SYSTEMS FOR INDICATING A SCHEDULE IN A WELDING-TYPE TORCH

BACKGROUND

Welding has increasingly become ubiquitous. Welding can be performed in automated manner or in manual manner (e.g., being performed by a human). During welding operations, welding settings or parameters may be adjusted, either by interacting directly on the welding equipment or remotely (e.g., via the welding-type torch). Indications relating to the welding settings or parameters may need to be presented to the operator.

Conventional approaches for presenting indications relating to welding settings and/or parameters in welding-type systems may be cumbersome, inefficient, and/or costly. Further limitations and disadvantages of conventional approaches for presenting indications relating to welding settings and/or parameters in welding-type systems will become apparent to one management of skill in the art, through comparison of such approaches with some aspects of the present method and system set forth in the remainder of this disclosure with reference to the drawings.

BRIEF SUMMARY

Aspects of the present disclosure relate to welding-type operations. More specifically, various implementations in accordance with the present disclosure are directed to indicating a schedule in a welding-type torch, substantially as illustrated by or described in connection with at least one of the figures, and as set forth more completely in the claims.

These and other advantages, aspects and novel features of the present disclosure, as well as details of an illustrated implementation thereof, will be more fully understood from the following description and drawings.

DETAILED DESCRIPTION

Figure 1:
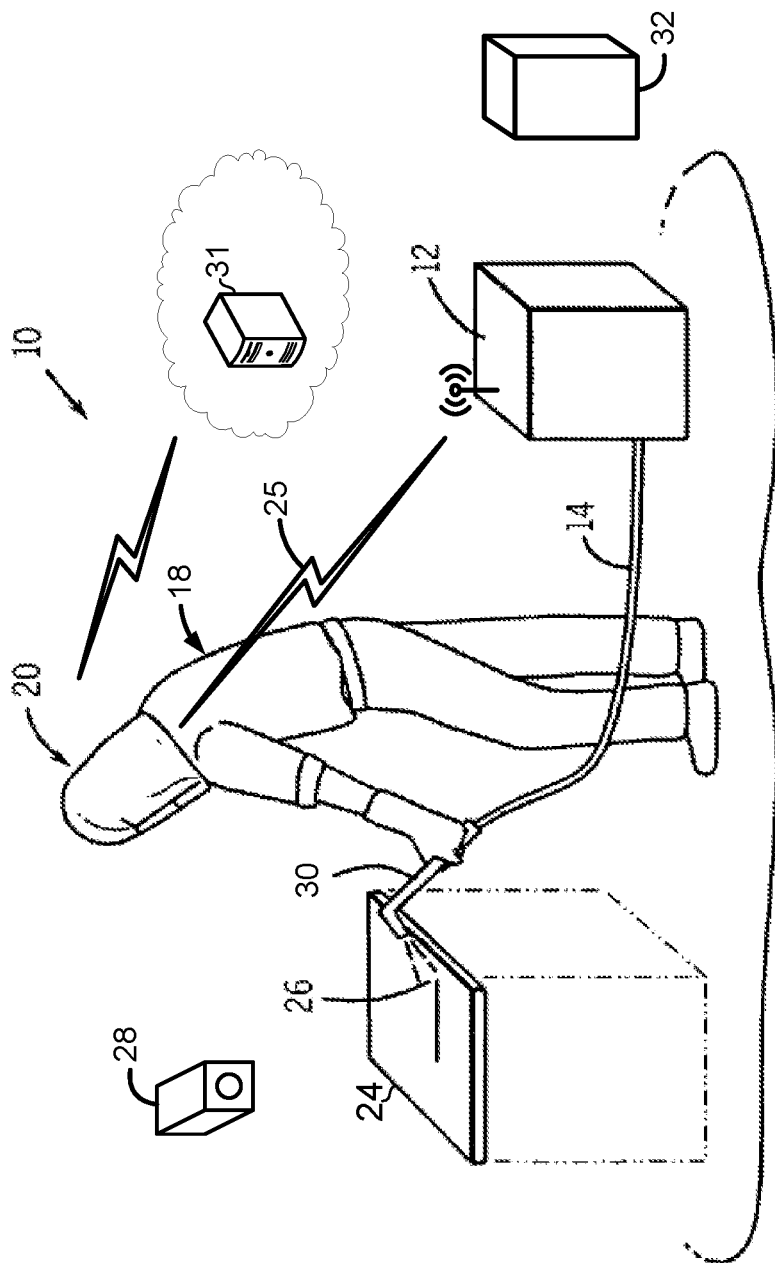
FIG. 1 depicts an example system that may be used for welding-type operations, in accordance with aspects of the present disclosure.

Various implementations in accordance with the present disclosure are directed to indicating schedules in welding-type torches. In this regard, in some instances, welding-type parameters may be set or adjusted. This may be done by setting individual parameters, or be setting a particular parameter (e.g., a welding schedule) which corresponds to setting specific value for each of one or more particular welding-type parameters. The operator may set or adjust the welding-type parameters (including, e.g., welding schedules) in a number of different ways, including by interacting with particular component in the welding setup (e.g., the component(s) to which the parameter(s) pertain, the welding torch, etc.), using suitable input device (e.g., pressing a button, turning a knob, etc.). Traditionally, the selected value of particular parameter is indicated at the component component(s) to which the parameter(s) pertain (e.g., the power supply or wire feeder, when the parameters is power related). Such approach may not be desirable, as such indications may not be viewable from the operators welding location. This may be particularly troublesome if the parameter is changed unintentionally.

Accordingly, in various implementations in accordance with the present disclosure, welding-type parameters (e.g., selected welding schedules) may be indicated directly on welding-type torches. An example welding-type system, in accordance with the present disclosure, may comprise a welding-type power source configured to provide welding-type power, a welding-type torch, driven by the welding-type power source, and configured for applying welds, and a welding-type connector configured for connecting the welding-type power source to the welding-type torch. The welding-type torch may comprise one or more indication components configured for providing, to a user of the welding-type system, indications relating to at least one of operations of the welding-type torch, status of welding-type operations, or welding-type parameters; the one or more indications comprise an indication of a present value of a particular welding-type parameter that pertains to configuration of the welding-type power source; and the one or more indication components are configured to provide the indication of present value of the particular welding-type parameter without requiring a change to structure of the welding-type connector. The welding-type connector may comprise a 4-pin connector.

In an example implementation, the welding-type torch comprises one or more control elements, and each control element is configured to control at least one of: adjusting operation of the welding-type torch, and setting value of a welding-type parameter.

In an example implementation, the welding-type connector comprises a plurality of wires, and each of the one or more control elements comprises a switch connected across two wires from the plurality of wires.

In an example implementation, the one or more indication components are configured to provide one or more distinct indications based on operation of the one or more control elements.

In an example implementation, at least one control element is configured to support both the adjusting of operation of the welding-type torch and the setting of the value of welding-type parameter. For example, at least one control element is configured to support two different forms of inputs, each of which corresponding to one of the adjusting of operation of the welding-type torch and the setting of the value of welding-type parameter.

In an example implementation, the one or more indication components comprise one or more visual feedback elements configured to provide a plurality of distinct visual indications. The one or more visual feedback elements comprise one or more light-emitting diodes (LEDs). The welding-type connector may comprise a plurality of wires, and each one of the one or more light-emitting diodes (LEDs) may be connected across two wires from the plurality of wires.

In an example implementation, the welding-type parameter pertaining to configuration of the welding-type power source comprises a selection of a particular welding-type power profile. For example, each welding-type power profile comprises one or more configuration settings applicable to or affecting the welding-type power source. The one or more configuration settings comprise at least one of: pre-flow time, start time, start voltage, start wire speed, weld time, weld voltage, weld wire speed, crater time, crater voltage, crater wire speed, and post-flow time.

Another example welding-type system, in accordance with the present disclosure, may comprise a welding-type torch configured for use during welding-type operations, with the welding-type torch comprising one or more feedback circuits for providing feedback to a user at the welding-type torch. The one or more feedback circuits are configured to provide one or more indications relating to one or both of welding-type parameters and operations of the welding-type torch; and each of the one or more feedback circuits is configured to operate based on two particular pins in an n-pin welding-type connector into the welding-type torch, wherein n is an integer equal to or greater than 2.

In an example implementation, the one or more indications comprise at least one indication relating to a welding-type device connected to the welding-type torch via the n-pin welding-type connector.

An example welding-type system, in accordance with the present disclosure, may comprise a welding-type power source configured to provide welding-type power source, with the welding-type power source comprising: one or more control circuits for controlling feedback circuitry in a peer welding-type device connected to the welding-type power source using an n-pin welding-type connector, n being an integer equal to or greater than 2. The one or more control circuits are operable to individually control each pin in the n-pin welding-type connector; and the one or more control circuits are configured to drive the feedback circuitry in the peer welding-type device by adjusting one or more particular pins in the n-pin welding-type connector.

In an example implementation, the one or more control circuits are configured to adjust current flow through particular pin pairs in the n-pin welding-type connector to drive the feedback circuitry in the peer welding-type device.

In an example implementation, the one or more control circuits comprise, for each pin in the n-pin welding-type connector, a resistor circuit and a transistor circuit.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing a first set of one or more lines of code and may comprise a second "circuit" when executing a second set of one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "example" means serving as a non-limiting example, instance, or illustration. As utilized herein, the terms "e.g. and for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

Welding-type operations, as utilized herein, comprise operations in accordance with any known welding technique, including flame welding techniques such as oxy-fuel welding, electric welding techniques such as shielded metal arc welding (i.e., stick welding), metal inert gas welding (MIG), tungsten inert gas welding (TIG), resistance welding, as well as gouging (e.g., carbon arc gouging), cutting (e.g., plasma cutting), brazing, induction heating, soldering, and/or the like.

Welding-type power, as utilized herein, refers to power suitable for welding, plasma cutting, induction heating, CAC-A (carbon arc cutting/air) and/or hot wire welding/preheating (including laser welding and laser cladding). Welding-type power supply, as used herein, refers to a power supply that can provide welding-type power. A welding-type power supply may include power generation components (e.g., engines, generators, etc.) and/or power conversion circuitry to convert primary power (e.g., engine-driven power generation, mains power, etc.) to welding-type power.

Welding-type connector, as utilized herein, refers to any existing/legacy connector that is commercially used in connecting welding-type power sources to welding-type torches (e.g., standard 4-pin connectors).

Structure of the welding type connector, as utilized herein, refers to legacy architecture of existing connectors—thus ensuring backward compatibility.

Operation of welding-type torch, as utilized herein, refers to starting and ending welding run—that is triggering weld via the torch.

Welding power profile, as utilized herein, refers to welding schedule or program, as described in the disclosure (e.g., a group of settings that configure a welding power source.)

FIG. 1 depicts an example system that may be used for welding-type operations, in accordance with aspects of this disclosure. Shown in FIG. 1 is shown an example welding-type arrangement 10 in which an operator 18 is wearing welding headwear 20 and welding a workpiece 24 using a welding-type torch 30 to which power is delivered by equipment 12 via a conduit 14, with weld monitoring equipment 28, which may be available for use in monitoring welding operations.

The equipment 12 may comprise a welding-type power source, optionally a source of an inert shield gas and, where wire/filler material is to be provided automatically, a wire feeder. Further, in some instances an engine 32 may be used to drive equipment or components used during welding operations. For example, the engine 32 may drive generators, welding-type power sources, etc. used during welding operations.

The welding-type arrangement 10 of FIG. 1 may be configured to form a weld joint by any known welding-type technique.

Optionally in any implementation, the welding equipment 12 may be arc welding equipment that provides a direct current (DC) or alternating current (AC) to a consumable or non-consumable electrode 16 of a welding-type torch 30. The electrode 16 delivers the current to the point of welding on the workpiece 24. In the welding-type arrangement 10, the operator 18 controls the location and operation of the electrode 16 by manipulating the welding-type torch 30 and triggering the starting and stopping of the current flow. When current is flowing, an arc 26 is developed between the electrode and the workpiece 24. The conduit 14 and the electrode 16 thus deliver current and voltage sufficient to create the electric arc 26 between the electrode 16 and the workpiece. The arc 26 locally melts the workpiece 24 and welding wire or rod supplied to the weld joint (the electrode 16 in the case of a consumable electrode or a separate wire or rod in the case of a non-consumable electrode) at the point of welding between electrode 16 and the workpiece 24, thereby forming a weld joint when the metal cools.

Optionally in any implementation, the weld monitoring equipment 28 may be used to monitor welding operations. The weld monitoring equipment 28 may be used to monitor various aspects of welding operations, particularly in real-time (that is as welding is taking place). For example, the weld monitoring equipment 28 may be operable to monitor arc characteristics such as length, current, voltage, frequency, variation, and instability. Data obtained from the weld monitoring may be used (e.g., by the operator 18 and/or by an automated quality control system) to ensure proper welding.

As shown, the equipment 12 and the headwear 20 may communicate via a link 25 via which the headwear 20 may control settings of the equipment 12 and/or the equipment 12 may provide information about its settings to the headwear 20. Although a wireless link is shown, the link may be wireless, wired, or optical.

Optionally in any implementation, equipment or components used during welding operations may be driven using engines. For example, the engine 32 may drive generators, welding-type power sources, etc. used during welding operations. In some instances, it may be desired to obtain information relating to used engines. For example, data relating to engines (and operations thereof) used during welding operations may be collected and used (e.g., based on analysis thereof) in monitoring and optimizing operations of these engines. The collection and use of such data may be performed telematically—that is, the data may be collected locally, subjected to at least some processing locally (e.g., formatting, etc.), and then may be communicated to remote management entities (e.g., centralized management locations, engine providers, etc.), using wireless technologies (e.g., cellular, satellite, etc.).

Figure 2:
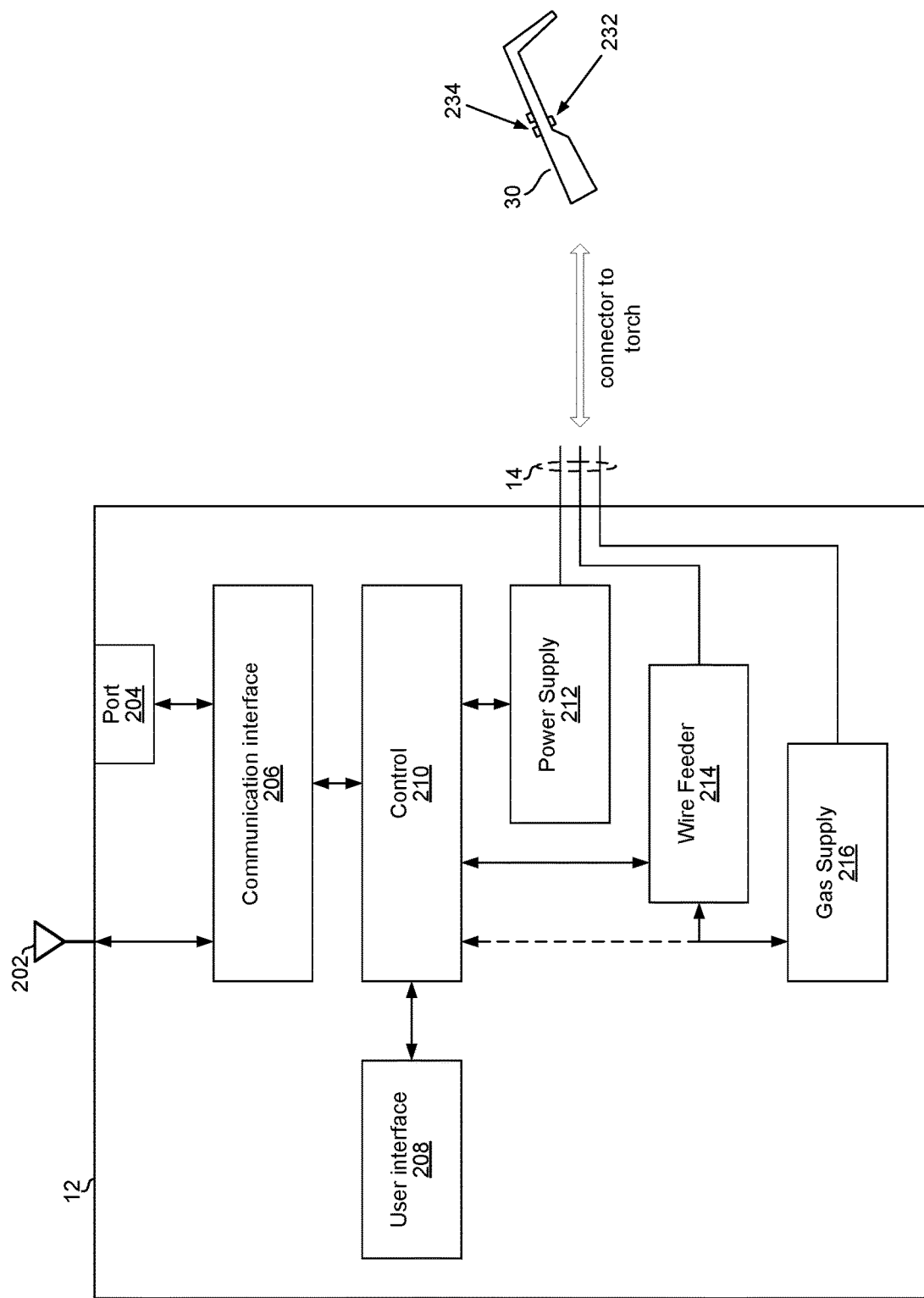
FIG. 2 depicts example welding equipment in accordance with aspects of the present disclosure.

FIG. 2 depicts example welding equipment in accordance with aspects of this disclosure. Shown in FIG. 2 is an example implementation of the equipment 12 of FIG. 1

As depicted in FIG. 2, the equipment 12 comprises an antenna 202, a communication port 204, communication interface circuitry 206, user interface module 208, control circuitry 210, power supply circuitry 212, a wire feeder module 214, and a gas supply module 216.

The antenna 202 may be any type of antenna suited for the frequencies, power levels, etc. used by the communication link 25.

The communication port 204 may comprise, for example, an Ethernet over twisted pair port, a USB port, an HDMI port, a passive optical network (PON) port, and/or any other suitable port for interfacing with a wired or optical cable.

The communication interface circuitry 206 is operable to interface the control circuitry 210 to the antenna 202 and/or port 204 for transmit and receive operations. For transmit, the communication interface 206 may receive data from the control circuitry 210 and packetize the data and convert the data to physical layer signals in accordance with protocols in use on the communication link 25. For receive, the communication interface may receive physical layer signals via the antenna 202 or port 204, recover data from the received physical layer signals (demodulate, decode, etc.), and provide the data to control circuitry 210.

The user interface module 208 may comprise electromechanical interface components (e.g., screen, speakers, microphone, buttons, touchscreen, etc.) and associated drive circuitry. The user interface 208 may generate electrical signals in response to user input (e.g., screen touches, button presses, voice commands, etc.). Driver circuitry of the user interface module 208 may condition (e.g., amplify, digitize, etc.) the signals and them to the control circuitry 210. The user interface 208 may generate audible, visual, and/or tactile output (e.g., via speakers, a display, and/or motors/actuators/servos/etc.) in response to signals from the control circuitry 210.

The control circuitry 210 comprises circuitry (e.g., a microcontroller and memory) operable to process data from the communication interface 206, the user interface 208, the power supply 212, the wire feeder 214, and/or the gas supply 216; and to output data and/or control signals to the communication interface 206, the user interface 208, the power supply 212, the wire feeder 214, and/or the gas supply 216.

The power supply circuitry 212 comprises circuitry for generating power to be delivered to a welding electrode via conduit 14. The power supply circuitry 212 may comprise, for example, one or more voltage regulators, current regulators, inverters, and/or the like. The voltage and/or current output by the power supply circuitry 212 may be controlled by a control signal from the control circuitry 210. The power supply circuitry 212 may also comprise circuitry for reporting the present current and/or voltage to the control circuitry 210. In an example implementation, the power supply circuitry 212 may comprise circuitry for measuring the voltage and/or current on the conduit 14 (at either or both ends of the conduit 14) such that reported voltage and/or current is actual and not simply an expected value based on calibration.

The wire feeder module 214 is configured to deliver a consumable wire electrode 16 to the weld joint. The wire feeder 214 may comprise, for example, a spool for holding the wire, an actuator for pulling wire off the spool to deliver to the weld joint, and circuitry for controlling the rate at which the actuator delivers the wire. The actuator may be controlled based on a control signal from the control circuitry 210. The wire feeder module 214 may also comprise circuitry for reporting the present wire speed and/or amount of wire remaining to the control circuitry 210. In an example implementation, the wire feeder module 214 may comprise circuitry and/or mechanical components for measuring the wire speed, such that reported speed is an actual value and not simply an expected value based on calibration.

The gas supply module 216 is configured to provide shielding gas via conduit 14 for use during the welding process. The gas supply module 216 may comprise an electrically controlled valve for controlling the rate of gas flow. The valve may be controlled by a control signal from control circuitry 210 (which may be routed through the wire feeder 214 or come directly from the control 210 as indicated by the dashed line). The gas supply module 216 may also comprise circuitry for reporting the present gas flow rate to the control circuitry 210. In an example implementation, the gas supply module 216 may comprise circuitry and/or mechanical components for measuring the gas flow rate such that reported flow rate is actual and not simply an expected value based on calibration.

In some instances, certain welding-type parameters (e.g., parameters applicable to welding operations and/or to particular welding-related components, functions, etc.) may be settable and/or adjustable. In this regard, the operator may be able to set and/or adjust each of these welding-type parameters. Further, in some instances, certain welding-type parameters may be grouping-based parameters—e.g., may correspond to groupings of various welding-type parameters (each applicable to particular component, function, etc.), such so that setting single value for each of these grouping-based parameters may translate into setting particular values for each of the corresponding individual parameters. One example of such grouping-based parameters is "welding schedules."

A welding schedule (sometimes referred to as a welding program) may correspond to a group of settings (values for one or more individual parameters) for configuring a welding-type power source. In this regard, as used hereafter, a welding-type power source may correspond to the component(s) providing power that drives the welding-type torch and welding operations in general. Thus, with reference to the welding equipment 12 shown in FIG. 2, for example, the "welding-type power source" may correspond to the power supply 212, but may also correspond to one or more of the power supply 212, the wire feeder 214, the gas supply 216 (that is, any combination of these components, as they drive the welding-type torch), or may correspond to the welding equipment 12 as a whole.

Welding schedules may be defined differently for different types of welding. For example, for MIG (GMAW) welding, a welding schedule may include (e.g., parameters applicable to) preflow time, start time, start voltage, start wire speed, weld time, weld voltage, weld wire speed, crater time, crater voltage, crater wire speed, postflow time, etc.

Further, a welding-type power source may support many different schedules (e.g., four selectable schedules)

The operator may set or adjust the welding-type parameters (including, e.g., welding schedules) in a number of different ways. For example, welding-type parameters (e.g., welding schedules) be changed by interacting with corresponding component in the welding arrangement—e.g., pressing a button or turning a knob, which may be provided on the welding-type power source (e.g., the power supply, or on a related component, such as wire feeder). The welding-type parameters may also be changed or set using the welding-type torch 30. In this regard, welding-type torches (such as the welding-type torch 30 shown in FIG. 2) may incorporate means for controlling operations of the welding-type torch (and, optionally, for setting or controlling welding-type parameters). The welding-type torch 30 may comprise, for example, a trigger 232, which may be configured for controlling operation of the welding-type torch 30 itself (e.g., starting/stopping application of welding via the welding-type torch 30). However, in some instances welding-type torches (e.g., the welding-type torch 30) may also incorporate one or more other control elements 234 for setting particular welding-type parameters (e.g., welding schedules).

Accordingly, welding schedules may be set or changed using the welding-type torch 30. This may be done, for example, using the trigger 232, such as by quickly pulling and releasing the trigger 232 ("trigger program select and trigger dual schedule" solution). In this regard, the trigger 232 may be configurable to receive different types of input, one corresponding to primary/main function of the trigger 232 (controlling the welding-type torch 30) and the other input direct to the secondary function of setting welding-type parameters (e.g., welding schedule). The different input may be characterized, for example, based on the duration and nature of action applied to the trigger—e.g., pressing and hold the trigger 232 for particular duration (e.g., for at least 3 seconds) for input directed to controlling the welding-type torch, and a quick toggle for setting the welding schedule. Alternatively, the welding schedules may be set or changed using a dedicated schedule switch 234 (e.g., by toggling it) on the welding-type torch 30 itself ("dual schedule" solution).

Traditionally, indicating the selected value of particular parameter (e.g., the welding schedule) is done at the welding-type power source side. Thus, to know which schedule is selected, the operator must view the welding-type power source or wire feeder. Such approach may not be desirable, however. In this regard, there are times where the schedule in not viewable from the operators welding location. This may be particularly inconvenient if the schedule is unintentionally changed.

Accordingly, in various implementations in accordance with the present disclosure, welding-type parameters (e.g., selected welding schedules) may be indicated directly on welding-type torches, such as using feedback (e.g., visual) elements implemented in the welding-type torches. In this regard, indicating welding-type parameters (e.g., selected welding schedules) may be done, preferably, in cost-effective manner (e.g., minimal added cost and complexity to welding-type torches), and without requiring changes to existing connectors between the welding-type torch and welding-type power sources. In other words, welding-type torched configured in accordance with the present disclosure remain compatible with existing connectors and/or interfaces between welding-type torches and welding-type power sources. In some instances, welding-type torches implemented in accordance with the present disclosure may also support enhanced parameter setting functions—e.g., setting and/or changing welding-type parameters (e.g., welding schedules) in more convenient manner than existing systems. An example implementation for use in conjunction with existing 4-pin welding-type torch connectors is described with respect to FIG. 3.

Figure 3:
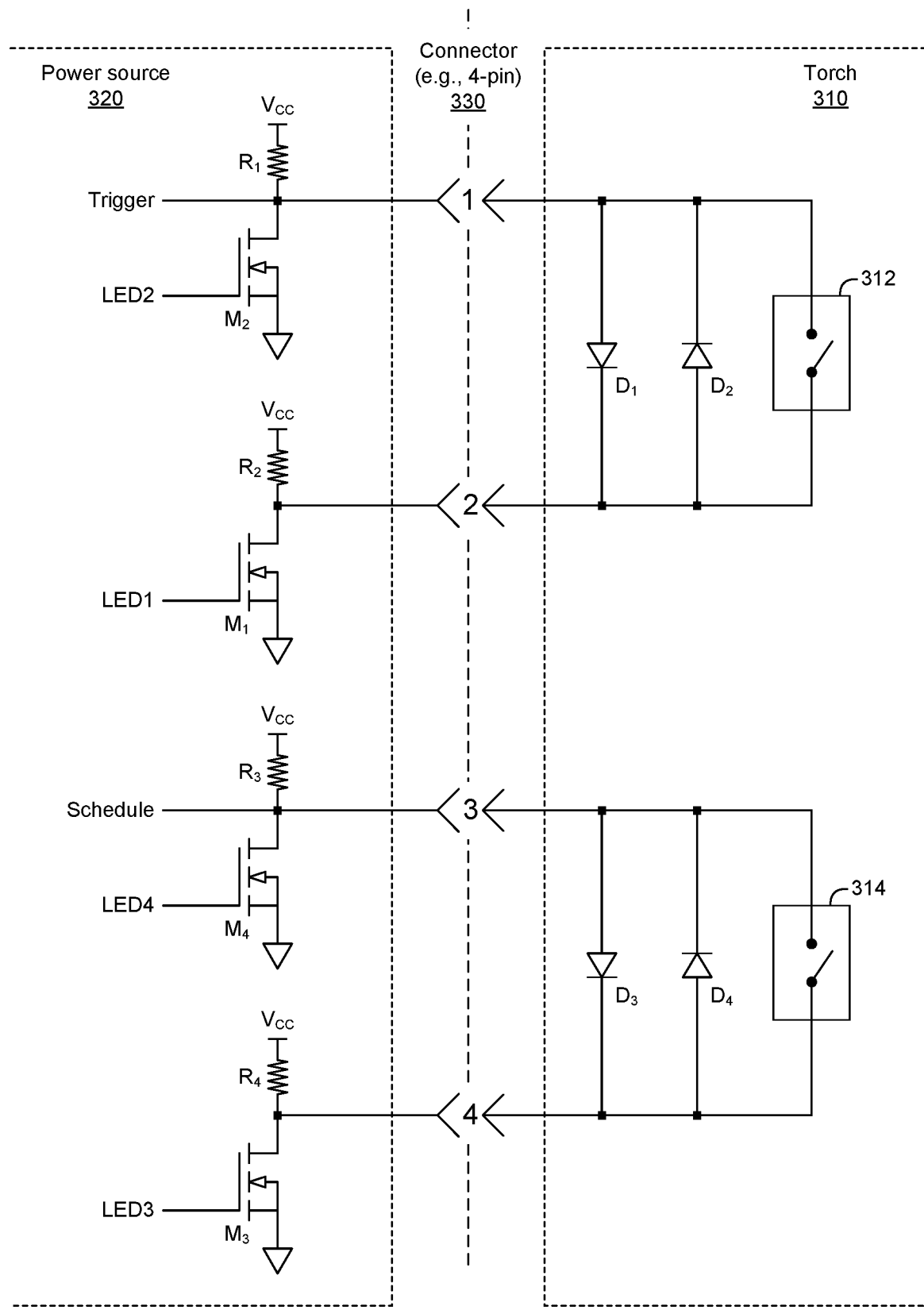
FIG. 3 depicts example connector circuitry between a welding-type torch and welding-type power source that supports optimized indication and/or selection of settings and parameters in the welding-type torch, in accordance with aspects of the present disclosure.

FIG. 3 depicts example connector circuitry between a welding-type torch and welding-type power source that supports optimized indication and/or selection of settings and parameters in the welding-type torch, in accordance with aspects of the present disclosure.

Shown in FIG. 3 is an example circuity 300 for supporting setting welding-type parameters (e.g., welding schedules) and providing indication of the set welding-type parameters). In this regard, the circuitry 300 is configured to maintain compatibility with existing connection layouts, and comprises only few circuits added at the welding-type torch side (e.g., welding-type torch 310) and at the welding-type power source side (shown as welding-type power source 320) to provide the desired additional functions (e.g., setting of welding-type parameters, providing indications at the welding-type torch side, etc.).

For example, in the particular implementation depicted in FIG. 3 the circuitry 300 is configured based on 4-pin connections used in many existing systems, represented as 4-pin connector 330 in FIG. 3. The connector 330/circuitry 300 may comprise 4 wires with two wires (over pin-1 and pin-2 in the connector 330) used for triggering functions. In this regard, a trigger switch 312 is incorporated into the welding-type torch 310 for triggering (starting and stopping) welding via the welding-type torch 310. The trigger switch 312 may be configured, for controlling triggering of the welding-type torch 310, as momentary open/closed switch.

The other two wires (over pin-3 and pin-4 in the connector 330) are used, such as for "dual schedule" solutions, to support schedule setting functions. In this regard, a schedule switch 314 is incorporated into the welding-type torch 310 for setting welding schedules welding via the welding-type torch 310. In this regard, the schedule switch 314 may be configured as open/closed toggling switch.

In some implementations, however, the secondary two wires (wires over pin-3 and pin-4 in the connector 330) are not used, such as for "trigger program select and trigger dual schedule" solutions. In this regard, the trigger switch 312 may be configured for supporting different forms of input, corresponding to the primary triggering function and secondary schedule setting function, respectively.

To provide indications at the welding-type torch side (e.g., via the welding-type torch 310), the circuitry 300 incorporates output elements at the welding-type torch side, which would be configured for operation in conjunction with existing connection layouts, and these output elements maybe selected and/or utilized particularly to provide indications at the welding-type torch 310 with minimal cost and complexity to the welding-type torch 310.

For example, in the particular implementation depicted in FIG. 3, 4 light-emitting diodes (LEDs), D1, D2, D3, and D4, are incorporated into the welding-type torch 310, and connected across the 4 wires of the 4-pin connection between the welding-type torch 310 and the welding-type power source 320. In particular, D1 and D2 may be connected (in opposite polarities) across wires 1 and 2, and D3 and D4 may be connected (again, in opposite polarities) across wires 3 and 4. The LEDs may be controlled from the welding-type power source side using the existing 4-wire connection. In this regard, the welding-type power source 320 may comprise 4 different control circuits corresponding to the 4 wires in the 4-pin connector 330, with each control circuit comprising a resistor (one of resistors R1, R2, R3, and R4) and transistor (one of transistors M1, M2, M3, and M4, which may be n-channel metal-oxide-semiconductor field-effect transistors (MOSFETs)). LED control signals (LED1, LED2, LED3, and LED4) are applied at the gate (G) terminals in the transistors to control M1, . . . , M4 to control the current between the source (S) and drain (D) terminals.

The LED control signals, alone or in combination with the state of the switches at the welding-type torch side, control and change the state (e.g., on or off, thus illuminated or not) of the LEDs D1, . . . , D4. Example use scenarios of the circuitry 300 are described with respect to FIG. 4.

Figure 4:
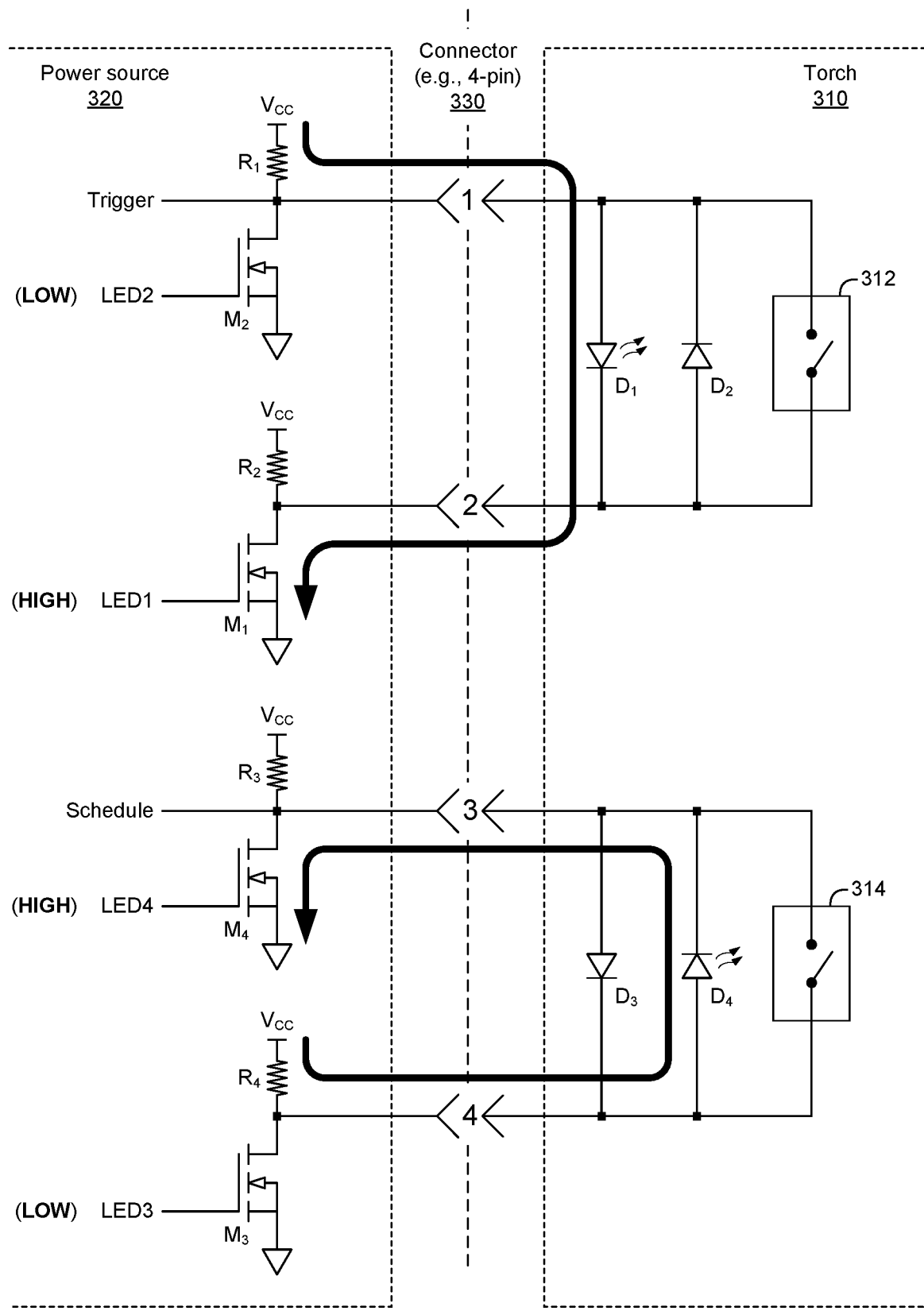
FIG. 4 depicts example use scenarios of the connector circuitry depicted in FIG. 3, in accordance with aspects of the present disclosure.

FIG. 4 depicts example use scenarios of the connector circuitry depicted in FIG. 3, in accordance with aspects of the present disclosure. In an example use scenario, to illuminate (turn on) LED D1, LED1 and LED2 are set (e.g., to high and low, respectively) such that transistor M1 is conducting and transistor M2 is blocking. Thus, the current travels from $V_{CC}$, through resistor R1, LED D1, and transistor M1. The voltage across LED D2 is reversed, therefore LED D2 does not illuminate.

In another example use scenario, to illuminate (turn on) LED D2, LED1 and LED2 are set (e.g., to low and high, respectively) such that transistor M1 is blocking and transistor M2 is conducting. Thus, the travels from $V_{CC}$, through resistor R2, LED D2 and transistor M2. The voltage across LED D1 is reversed, therefore LED D1 does not illuminate.

In another example use scenario, to turn on both LED D1 and LED D2, LED1 and LED2 are set to continually switch (thus continually flipping the blocking and opening of transistor M1 and transistor M2). In this regard, if the frequency of switching is sufficiently enough, the illuminating of LEDs D1 and D2 switching on and off frequently enough that the human eye may perceive the light emission by each of LEDs D1 and D2 as continuous, but with a reduced intensity.

In some instances, the intensity of the LEDs may also be controlled with the current limiting resistor, resistors R1-R4. The LEDs D3 and D4 may be control in similar manner using the corresponding LED3 and LED4 inputs.

The circuitry 300 may allow detection of the states of the control elements—e.g., trigger switch 312 and schedule switch 314. For example, to detect the state (e.g., open or closed) of the trigger switch 312, LED D1 is first illuminated (this can be done in the manner described above). When the trigger switch 312 is in the open state, the current passes through LED D1, and not through the trigger switch 312. The voltage at pin-1 is the forward voltage drop across LED D1. For a red LED at 20 mA, this may be about 2 volts. When the trigger switch 312 is closed, current passed through the trigger switch 312, and not LED D1. The voltage at pin-1 is the voltage drop across the trigger switch 312, which is close to 0 volts. So the switch state can be determined based on the voltage at pin-1, such as by measuring the voltage at pin-1.

The circuitry 300 may allow detection of presence of the LEDs in the welding-type torch. For example, to detect the presence of LEDs in the welding-type torch, LED D1 is first illuminated (or is attempted to be illuminated). If the welding-type torch with LEDs is present, the voltage at pin-1 is the voltage drop across the LED D1. As noted above, for a red LED at 20 mA, this may be about 2 volts. If the welding-type torch is absent or a welding-type torch without LEDs is present, the voltage at pin-1 is $V_{CC}$, this may be 3.3 volts. So the presence of the LEDs in the welding-type torch can be determined by measuring the voltage at pin-1. This detection may enable/disable certain features in the welding-type power source or simply indicate to the operator the type of welding-type torch detected.

The circuitry 300 may be configured for allowing setting or changing welding-type parameters, such as welding schedules. This may be done using the dedicated input element; or, alternatively, using a trigger used to control the welding-type torch 310. Such trigger may be configured to support different types of input, with one for the primary function (that is controlling the welding-type torch itself) and remaining types of input for handling setting of welding-type parameters such as welding schedules. Switching between welding schedules via the trigger may be done, for example, based on quick pull-and-release (tapping) the trigger, which then increments the welding schedule to the next enabled welding schedule in a circular manner. For example, the welding-type power source may have 4 welding schedules and welding schedules 1, 3 and 4 are enabled. If the selected welding schedule is 1, then tapping the trigger changes to welding schedule 3. Tapping the trigger again changes to welding schedule 4. Tapping the trigger again changes to welding schedule 1. So to get to the desired welding schedule, the operator must know the welding schedule that is currently selected, and also the welding schedules that are enabled.

Alternatively, the trigger may be configured to support different and faster way to change welding schedules, which includes using number of taps applied to the trigger to select the welding schedule. Thus, tapping the trigger 3 times changes to welding schedule 3, tapping the trigger 1 time changes to welding schedule 1. If the operator tries selecting a welding schedule that is not enabled, the welding schedule is not changed. So to get to the desired welding schedule, the operator only needs to know the desired welding schedule is enabled.

Other implementations in accordance with the present disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various implementations in accordance with the present disclosure may be realized in hardware, software, or a combination of hardware and software. The present disclosure may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various implementations in accordance with the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain implementations, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular implementation disclosed, but that the present disclosure will include all implementations falling within the scope of the appended claims.

What is claimed is:

1. A welding-type system, comprising:
    a welding-type power source to provide welding-type power;
    a welding-type torch, driven by said welding-type power source, configured for applying welds; and
    a welding-type connector configured for connecting the welding-type power source to the welding-type torch; wherein:
        said welding-type torch comprises one or more control elements for controlling welding-type operations, the controlling comprising or relating to triggering functions and scheduling functions;
        said welding-type torch comprises one or more indication components configured for providing indications relating to at least one of said welding-type torch, status of welding-type operations, or welding-type parameters;
        said one or more indication components are controlled from the welding-type power source based on operation of or interaction with said one or more control elements;
        said welding-type connector comprises a 4-pin connector comprising four wires, with two wires for use in triggering functions and other two wires for use in supporting scheduling functions;
        said one or more control elements comprise at least one triggering control element configured for controlling triggering functions and connected across said two wires and at least one scheduling control element configured for controlling scheduling functions and connected across said other two wires; and
        the at least one of said one or more indication components is configured to provide indications based on both of:
            user interaction with at least one of said one or more control elements, and
            signals applied by said welding-type power source into one or more of said four wires.

2. The welding-type system of claim 1, wherein each control element is configured to control at least one of:
    adjusting operation of said welding-type torch, and
    setting value of a welding-type parameter.

3. The welding-type system of claim 2, wherein at least one control element is configured to support both said adjusting of operation of said welding-type torch and said setting of said value of welding-type parameter.

4. The welding-type system of claim 3, wherein said at least one control element is configured to support two different forms of inputs, each of which corresponding to one of said adjusting of operation of said welding-type torch and said setting of said value of welding-type parameter.

5. The welding-type system of claim 1, wherein said one or more indication components are configured to provide one or more distinct indications based on operation of said one or more control elements.

6. The welding-type system of claim 1, wherein said one or more indication components comprise one or more visual feedback elements configured to provide a plurality of distinct visual indications.

7. The welding-type system of claim 6, wherein said one or more visual feedback elements comprise one or more light-emitting diodes (LEDs).

8. The welding-type system of claim 7, wherein each one of said one or more light-emitting diodes (LEDs) is connected across one of said two wires or said other two wires.

9. The welding-type system of claim 8, wherein said one or more visual feedback elements comprise at least four light-emitting diodes (LEDs) arranged into two pairs, with each pair arranged as counter-parallel LEDs across one of said two wires or said other two wires.

10. The welding-type system of claim 1, wherein at least one of said one or more indication components is configured for providing an indication of a present value of a welding-type parameter that comprises a selection of a particular welding-type power profile.

11. The welding-type system of claim 10, wherein each welding-type power profile comprises one or more configuration settings applicable to or affecting said welding-type power source.

12. The welding-type system of claim 11, wherein said one or more configuration settings comprise at least one of: pre-flow time, start time, start voltage, start wire speed, weld time, weld voltage, weld wire speed, crater time, crater voltage, crater wire speed, and post-flow time.

13. The welding-type system of claim 1, wherein:
    the welding-type power source comprises:

one or more control circuits for controlling said one or more control elements and said one or more indication components;

wherein:
the one or more control circuits are configured to individually control each pin in the 4-pin connector;

the one or more control circuits are configured to receive via one or more pins of the 4-pin connector input provided via the one or more control elements;

the one or more control circuits are configured to drive the one or more indication components by adjusting one or more particular pins in the 4-pin connector; and the one or more control circuits are configured to concurrently drive the one or more indication components and to receive input from at least one of the one or more control elements.

14. The welding-type system of claim 13, wherein the one or more control circuits are configured to adjust current flow through particular pin pairs in the 4-pin connector to drive the one or more indication components.

15. The welding-type system of claim 13, wherein the one or more control circuits comprise, for each pin in the 4-pin connector, a resistor circuit and a transistor circuit.

16. A welding-type system, comprising:
a welding-type torch configured for use during welding-type operations, the welding-type torch comprises:
one or more control elements for controlling welding-type operations; and
one or more feedback circuits for providing feedback to a user at the welding-type torch,
wherein:
the one or more feedback circuits are configured to provide one or more indications relating to one or both of welding-type parameters and operations of the welding-type torch;

the one or more feedback circuits are controlled based on operation of or interaction with said one or more control elements;

each of the one or more feedback circuits is configured to operate based on two pins in a 4-pin welding-type connector into the welding-type torch, the 4-pin welding-type connector comprising four wires, with two wires for use in triggering functions and other two wires for use in supporting scheduling functions;

the one or more control elements comprise at least one triggering control element configured for controlling triggering functions and connected across the two wires and at least one scheduling control element configured for controlling scheduling functions and connected across the other two wires; and the at least one of the one or more feedback circuits is configured to provide indications based on both of:
user interaction with the at least one of the one or more control elements, and
signals applied by a peer device into the same two pins in the n-pin welding-type connector.

17. The welding-type system of claim 16, wherein the one or more feedback circuits comprise one or more light-emitting diodes (LEDs).

18. The welding-type system of claim 17, wherein the one or more feedback circuits comprise at least four light-emitting diodes (LEDs) arranged into two pairs, with each pair arranged as counter-parallel LEDs across one of the two wires or the other two wires.

19. The welding-type system of claim 16, wherein the one or more indications comprise at least one indication relating to a welding-type device connected to the welding-type torch via the 4-pin welding-type connector.

* * * * *